Feb. 23, 1971   J. G. STRANCH ET AL   3,565,665
SOLVENT VAPOR FUSION METHOD
Filed May 22, 1969   2 Sheets-Sheet 1

JAMES G STRANCH
EDWARD E DENISON
INVENTORS

BY

ATTORNEY

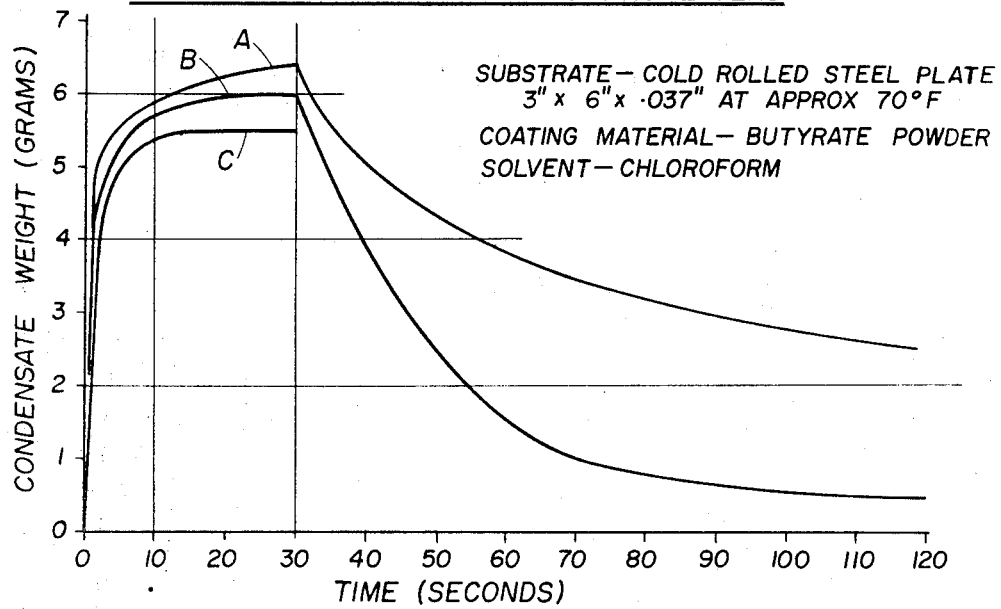

FIG. 6 SOLVENT CONDENSATION AND EVAPORATION RATE FOR A SUBSTRATE WITH DIFFERING COATING LAYERS

SUBSTRATE— COLD ROLLED STEEL PLATE 3" x 6" x .037" AT APPROX 70°F
COATING MATERIAL— BUTYRATE POWDER
SOLVENT— CHLOROFORM

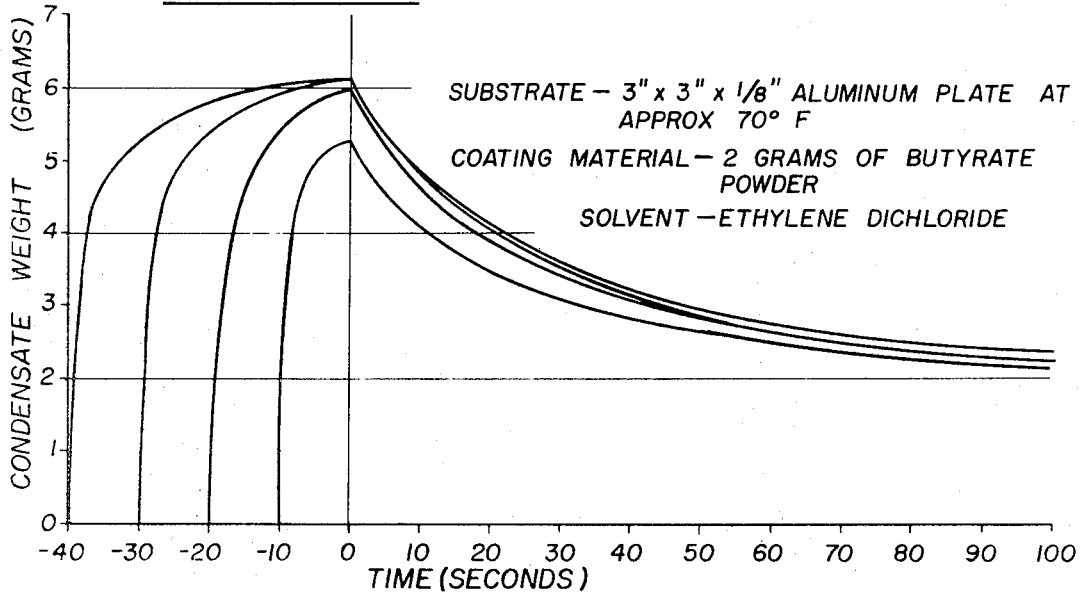

FIG. 7 COMPARISON OF SOLVENT RETENTION FOR DIFFERENT IMMERSION TIMES

SUBSTRATE — 3" x 3" x 1/8" ALUMINUM PLATE AT APPROX 70° F
COATING MATERIAL— 2 GRAMS OF BUTYRATE POWDER
SOLVENT —ETHYLENE DICHLORIDE

JAMES G. STRANCH
EDWARD E. DENISON
INVENTORS

BY

ATTORNEY

United States Patent Office 3,565,665
Patented Feb. 23, 1971

3,565,665
SOLVENT VAPOR FUSION METHOD
James G. Stranch and Edward E. Denison, Kingsport, Tenn., assignors to Eastman Kodak Company, Rochester, N.Y., a corporation of New Jersey
Continuation-in-part of application Ser. No. 491,287, Sept. 29, 1965. This application May 22, 1969, Ser. No. 830,916
Int. Cl. B44d *1/48, 1/094*
U.S. Cl. 117—21                                      7 Claims

ABSTRACT OF THE DISCLOSURE

A method for coating an article with a continuous polymeric film including the steps of (a) depositing and adhering a layer of polymeric material in particulate form to the article's exterior surface, (b) maintaining the coated article at a temperature below the boiling point of a selected composition which is a solvent for the polymeric material at its boiling point and within a temperature range below its boiling point, and (c) exposing the article to an atmosphere containing the selected composition in vapor form, whereby the vapors condense on the surface of the article and cause the polymeric material to fuse and form a continuous film on the surface of the article.

---

Figure 1:
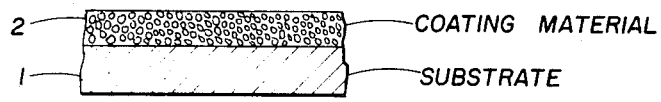

This application is a continuation-in-part of our copending application Ser. No. 491,287, filed Sept. 29, 1965, and now abandoned.

This invention concerns a method of producing a smooth, substantially voidless, film on a substrate. More specifically, this invention involves a method wherein a porous layer of coating material is initially distributed on or adhered to a substrate in a continuous manner, and thereafter is dissolved and bonded into a smooth, substantially voidless film by a solvent which has been condensed on the substrate and coating layer. As used herein the terms "fuse," "fused" or "fusion" include not only complete fusion but also partial fusion in which a suffiicent portion of the surface of the coating material particles is dissolved to provide a homogeneous, substantially voidless bonding of the continuous porous coating layer. We use the word "porous" in a broad sense to mean that the layer of powdered or particulate coating material is pervious and permeable to solvent vapors and condensate. According to a novel feature of this invention, a major portion of the solvent vapor permeates the porous coating and is condensed upon the substrate surface so as to progressively fuse the layer from the interior thereof, immediately adjacent the substrate, to the exterior portion most remote from the substrate. Because the major portion of the solvent vapor condenses on the substrate, the present method assures that the interior portions of the porous coating layer will fuse before, or at least as soon as, the exterior surface of the coating layer so that voids and bubbles are eliminated.

It is within the scope of this inveniton to use the method hereinafter described to produce various moldings and castings upon suitably designed substrates from which they may subsequently be removed for use. The term "films," as used within the specification and claims, therefore includes such moldings and castings as can be produced by the method herein disclosed, as well as layers of fused coating material which are intended to remain on the substrate. Likewise, the term "coating material," as used within the specification and claims, refers to particulate and other suitable forms of solid materials, such as can be suitably dissolved and fused according to the present method in a manner exemplified by the specific coating materials hereinafter described. The present method has been found to be particularly suitable in fusing layers of particulate polymer coating material but is applicable to "coating materials" of other substances and forms. Also, the present method contemplates the formation of continuous protective coatings of at least 1 mil thickness on substrates of considerable mass and which are nonabsorptive with respect to the dissolved polymeric coating.

The substantially voidless films produced according to the method of this invention find many uses such as for protecting, insulating, smoothing, beautifying or otherwise modifying the surface characteristics of various substrates as well as having independent uses in various article forms.

Various methods have been previously known for producing polymeric coatings on substrates. For example, it is known to dip a hot substrate into a bed of fine polymeric particles so that the particles which contact the substrate melt and form a fused layer on the substrate.

Polymeric films can also be produced on substrates by electrostatically attracting particles of polymer to adhere onto a substrate and thereafter heating the substrate so as to melt the particles and form a fused layer on the substrate.

In many instances it is desirable that the films have a smooth polished surface, free from defects. The polymeric films produced by known heat fusing methods are often dull in appearance and quite frequently display defects caused by bubbles, running of the melted coating or an incomplete melting. Further, the known high temperature methods cannot be used to coat substrates which are adversely affected by heat. The present method also provides yet another advantage in that it allows use of more viscous coating materials than possible with the previously known methods of forming thin films, so that thin films of higher toughness and impact resistance can be achieved.

It can be seen, therefore, that the present invention constitutes a considerable advance over prior methods of producing films in that the films produced by the present method are smooth, homogeneous and substantially void-free; also, the film is of considerable thickness and continuous. The method of this invention affords further advantages in that it can be performed at temperatures below the melting point of the coating material, thus avoiding the possibility of heat damage to the substrate, inherent in the previously known methods. For the aforementioned reasons and because the method is simply and economically adaptable for use on substrates differing in shape and composition, it is apparent that the vapor fusion method herein disclosed affords a most desirable process of producing films. It should be noted that the actual fusion according to the present method is achieved by condensed solvent vapors.

It is also known in the art to apply powdered images to an absorbent substrate such as paper and then substantially impregnate the image into the substrate by treating the image with a solvent for the particular powder image used. The present method is distinguishable from this method in that the substrate is massive and non-absorbent, and in that a continuous protective coating of substantial thickness, i.e., at least 1 mil is applied thereto.

It is therefore, one object of this invention to provide a method whereby films can be formed on a wide variety of substrate shapes and materials utilizing temperatures substantially below the melting point of the coating material.

Another object of this invention is to provide a method for producing tougher protective films having a smooth and lustrous surface.

Yet another object of this invention is to provide a method for producing films which are homogeneous and substantially voidless.

Still another object of this invention is to provide a method to produce films on selected substrates simply and economically of coating material.

Other objects of this invention will be apparent from the following drawings and description in which:

FIGS. 1–5 are cross-sectional view of a typical substrate and coating material layer during successive stages of the present method.

FIG. 6 is a graph illustrating the weight of condensate formed on the same substrate when exposed to solvent vapors under the same conditions but having in each instance differing thicknesses of coating material layers thereon. In FIG. 6, curve A illustrates the weight of condensate formed on the substrate having a 5.5 mil layer of Tenite® butyrate, a product of Tennessee Eastman Company, adhered thereon. Curve B illustrates the weight of condensate formed on the same substrate but with only a 1.5 mil coating layer of Tenite® butyrate and curve C ilustrates the weight of condensate formed on the same substrate with no coating layer thereon.

Similarly, FIG. 7 illustrates a comparison of the solvent retention of several completely fused Tenite® butyrate coating layers which had different immersion periods in the solvent vapors.

According to the novel method of this invention, the selected polymeric material, in particulate or other hereinafter described forms, is initially adhered to and/or distributed on the selected substrate so as to form a porous layer of the desired thickness thereon. The substrate and porous layer of coating material are next exposed to the vapors of a solvent which is selected according to its dissolving characteristics upon coating material. In accordance with this invention, the solvent to which the porous layer of coating material is exposed is a composition which is a solvent at its boiling point and for a certain temperature range therebelow, but is often a nonsolvent or a weak solvent at temperatures below this range. The substrate is brought to a temperature below the boiling point of the solvent so that the solvent vapors will condense on the substrate, but sufficiently high to be within the tempertaure at which the composition acts as a solvent. Because the major portion of the condensing vapors permeates through the porous layer and condenses upon the substrate, the dissolution and flowout, i.e., fusion, of the porous coating layer at that portion of the layer immediately adjacent the substrate surface occurs at least simultaneously with and generally before the fusion of the exterior portions of the coating layer. It has been found most desirable that dissolution and fusion of the porous layer progresses outwardly from the initially fused interior portion of the layer to the exposed outer surface of the layer. Although some of the condensing vapors are condensed upon the polymeric coating material itself, this amount of condensate is so small that no substantial dissolution occurs until the material is affected by the major portion of vapor condensate which progressively accumulates from the substrate surface outwardly to the exterior surface of the layer. The coated substrate is next removed from the environment of hot vapors where removal of the composition from the coating is thereby accelerated. After the layer is completely fused by the condensed vapors, the remaining volatile solvent is evaporated by normal aging or in moderate heat. A preferred method of removing the solvent is by moderate heating in a solvent recovery system.

Figure 2:
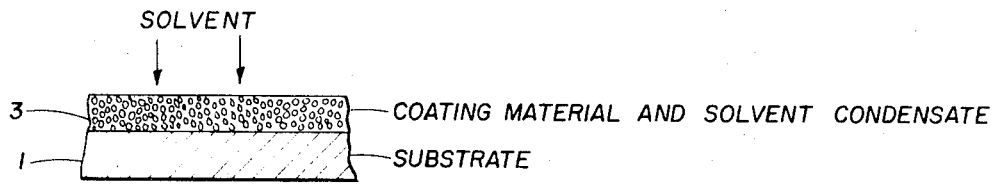
Figure 3:
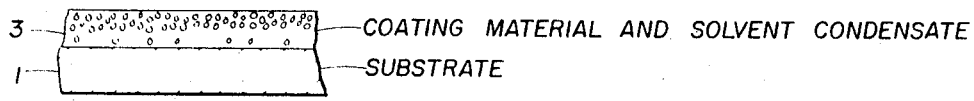
Figure 4:
Figure 5:

By reference to the drawings shown in FIGS. 1–5 which are illustrative in nature, the progressive stages of one embodiment of the method of this invention can be seen. In FIG. 1, a cross-section of a typical substrate 1 is shown before exposure to solvent vapors and with the porous layer 2 of coating particles adhered thereto. FIG. 2 shows the substrate and porous layer after exposure to the solvent vapors, at a time when some vapors have condensed on the substrate surface, but before any visible flow out or fusion of the coating material has occurred so that a mixture of coating particles and condensate 3 exists. FIG. 3 illustrates the initial flow out and fusion occurring within the mixture of condensed solvent and coating particles 4. FIG. 4 illustrates the progressive flow out and fusion of the condensate-coating material mixture from the substrate surface outward. FIG. 4 shows the uniformly fused layer 4 after flow out and fusion has progressed to the exterior surface of the porous layer. It is thought that the condensed vapor affect the porous layer in a progressively outwardly direction partially because the dissolving and fused particles displace the condensate outward and partially because the dissolved layer becomes the primary condensing surface for other vapors after the substrate surface is covered. In some instances, as for example, where the substrate-vapor temperature differential is large or the thermal conductivity of the substrate is high, the solvent is condensed so rapidly that fusion occurs throughout the porous layer substantially simultaneously. It is therefore pointed out that such a manner of fusion is within the scope of the present invention, the only critical sequence of fusion in the present method being that the interior portion is fused at least as soon as the exterior portions so as to prevent voids and bubbles. This result, i.e., fusion of the interior portion at least as soon as the other portions of the layer, is assured according to the present invention's novel feature of condensing the major portion of the solvent on the substrate.

The phenomenon whereby the majority of the vapors condense upon the substrate is believed to result at least in part because of the difference in mass of the substrate with respect to the adhered polymer particles. As is well known, condensation occurs when the heat of vaporization is absorbed by a lower temperature condensing surface. Because of the greater mass of the substrate surface, the condensing heat of the vapors is absorbed without the rapid temperature rise which a corresponding absorption of condensing heat effects on the low mass coating particles. Since the transfer of heat per unit area of condensing surface depends upon the temperature differential between the vapors and condensing surface and upon a heat transfer coefficient for the particular material of which the condensing surface is composed, it can be seen that a higher temperature differential existing between the substrate and solvent vapors because of the larger mass of the substrate will cause a correspondingly larger portion of the solvent vapors to condense upon the substrate surface.

The foregoing is set forth only as explanation of what is presently believed to cause the phenomenon disclosed and should not serve to limit the applicants' invention in the event other explanations of the applicants' procedures and results are discovered in the future. It is also pointed out that other variables besides the mass of the substrate have an effect upon the condensing of the vapors and, as subsequently described, may be utilized to regulate desired condensate amounts.

Numerous substrates can be coated by the process of this invention, such as for example, metal, wood, glass and plastic articles. It is generally desirable that the substrate coated be relatively inert to the effect of the particular solvent utilized.

Substrates may be cleaned or otherwise pretreated, such as for example, by painting, priming, or applying adhesion promoters, prior to the adhering of the porous layers. Successive coatings may be formed upon a substrate by repetition of the process with the same or different polymers and solvents. It has been discovered that adhesion of some polymeric coatings can be greatly increased by utilizing the present method to form a subcoating which adheres to the metal and forms a good adhesive base for a second outer coating of another desired polymer.

Suitable polymeric coating materials for use according to this invention include for example, cellulosic materials such as cellulose acetate butyrate and cellulose acetate propionate, polyolefins such as polyethylene, polypropylene, polybutene-1, and copolymers of alpha-olefins, polyester including polyethylene terephthalate, poly(1,4-cyclohexanedimethylene terephthalate), as well as polycarbonates, polyvinyls, polyacetals, polyacrylics, polyepoxies, and numerous other synthetic and polymeric compounds. Likewise, naturally occurring gelatins and other dissolvable particulate solids are also suitable for use in this method. The preferable form of polymer coating material is a finely divided powder having a high surface area to volume ratio, but other particulate forms such as staple fibers and granules are operable. The process is also operable with other polymer forms including mesh, fibers, and filaments.

Operable particle sizes include those smaller than 40 mesh with the lower particle size limit being the point at which handling, dusting and recollection becomes a problem. A screen analysis of a typical powder for use in the method of this invention is as follows:

| Tyler sieve No. | Percent on sieve |
|---|---|
| 65 | 2 |
| 100 | 10 |
| 150 | 24 |
| 200 | 32 |
| 270 | 20 |
| 325 | 7 |
| Pan | 5 |

It is desirable that 30–50% by weight of the particles would pass through a 200 mesh screen. A mesh distribution of exceptional desirability for use in the present method would be one similar to the above screen analysis but wherein all material on or above a 150 mesh screen was eliminated. As is evident from the aforegoing description, quality of the coating formed is improved with the increasing fineness of the coating powder used up to the limiting point mentioned above.

It has also been found that higher viscosity coating materials are more easily utilized in this process because of their resistance to being washed off the substrate by excess condensate; however, lower viscosity materials can be successfully utilized by regulation to control the amount of condensate forming on the substrate as hereinafter described. It is also pointed out that the present method affords means for forming thin films of highly viscous and tough polymers such as the cellulose acetate butyrate, hereinafter described, which was not previously possible using prior art methods.

A number of known means exist for adhering the porous layer to the substrate before exposure to the solvent vapors. The known methods of electrostatic attraction provide convenient and desirable methods for accomplishing the preliminary adherence. In accordance with electrostatic methods, the difference in the electrostatic charge upon the particulate polymer and the substrate surfaces attracts and holds the particulate matter onto the substrate. Electrostatic devices embodying a fluidizing bed, an air gun or other dispersing method can be successfully used in this method. By another method of adhering, the substrate may be treated so as to form a tacky surface to hold the particulate matter thereon. Still another means of producing the porous layer is to extend a heated substrate into a fluidized bed of particulate material, the heated substrate affecting the fluidized particles so as to cause a surface adhesion between the particles without effecting a complete homogeneous bonding. Other methods of adhering which provide a relatively dense but porous layer of material upon the substrate could likewise be used within the scope of this invention, e.g., in forming a planar coating the porous layer might be merely spread on the upper surface of a suitable flat substrate and exposed to vapors while held in position by gravity.

A porous coating layer thickness of 35 mils and greater may be achieved in coating operations utilizing electrostatic attraction. The thickness of the porous coating layer can be regulated by varying the electrostatic charge and time to substrate exposure to the charged coating particles.

In ordinary applications of this process, it is desirable to select a solvent which suitably dissolves the coating material but which has no materially adverse effect upon the specific substrate coated. Low boiling solvents are preferred for ease of application and recovery. Suitable solvents for the coating layers can be selected for their known characteristics with respect to the coating material and substrate used. The solvents can be vaporized by any one of the ordinary units which heat the solvents to the boiling point. Such units are presently in wide commercial use for degreasing and other cleaning purposes, the essential features being only means to hold and heat the solvent.

Examples of those solvents which are operable in the method of this inventiin include chloroform, trichloroethylene, ethylene dichloride, tetrahydrofuran, isopropyl alcohol, n-propyl alcohol and polymeric material.

It is found desirable to preheat the substrate plates when using the higher boiling solvents, such as trichloroethylene, in order to control, i.e., reduce, the substrate-solvent vapor temperature differential and hence to reduce amount of condensate formed on the substrate. It has been found that various contaminates can be used to affect the known solvent properties, e.g., the boiling points, and that mixtures of solvents forming azeotropes likewise can be advantageously used in accordance with the present mode. It is pointed out that various other solvents may be utilized within the scope of this invention for their known effects on particular coating materials.

As has been previously mentioned, it is frequently desirable in accordance with the present method, to regulate the quantity of condensate forming upon the substrate surface. For example, regulation of the quantity of condensate is desirable when a low viscosity coating material is used in the process in order to avoid a washing-off of coating layer by excess condensate. Likewise, regulation of the condensate quantity is desirable when coating a low-mass substrate, in order to obtain sufficient condensation of solvent vapors to effect a complete fusion. In many other applications of the present process, it is desirable to regulate condensate quantity so as to obtain higher quality coatings.

It has been discovered that preconditioning of the substrate temperature prior to exposure to the solvent vapors affords an effective means of regulating the quantity of vapor which condenses upon the substrate. In those applications where it is desired to decrease the quantity of condensate on the substrate, it has proven effective to preheat the substrate so as to decrease the temperature differential between the solvent vapors and the substrate. In a similar manner a precooling of the substrate effects an increase of vapor condensation by increasing the solvent vapor-substrate temperature differential.

The substrate-solvent vapor temperature differential can also be controlled by regulating the substrate temperature during exposure to the solvent vapors. Such a regulation of substrate temperature during exposure to the vapors, as for example, by backing the substrate with a controlled temperature mass or heat sink therefore provides another desirable means to regulate the quantity of condensate forming on the substrate.

In applications of this invention in which the quantity of condensate is desirably regulated, appropriate selection of a solvent according to its density and its thermal properties such as vaporization temperature and latent heat of vaporization can also be used to achieve the desired quantity of condensate. In a similar manner, the mixing of solvents to form azeotropes having appropriate thermal properties, in addition to the desired solvent properties, provides another means to control the quantity of vapor condensing.

It is also pointed out that regulation of condensate quantity can likewise be effected by varying the pressure conditions under which the process is performed, since a variance in pressure affects the condensing temperature of the solvent vapors and correspondingly changes the temperature differential between the substrate and solvent vapors.

Although the quantity of condensate can be controlled to some extent by regulating the vapor exposure time, the short period of time during which most of the total condensate forms on the substrate (see graphs, FIGS. 6–7) makes quantity control of the condensate by time regulation very difficult.

Regulation of the time of exposure to the solvent vapors is desirable for another purpose, however. It has been found that if the substrate and porous layer are removed from the solvent atmosphere after the condensate has formed on the substrate but before the proper degree of "flow out" of the porous layer has occurred, the condensed solvent can evaporate before the flow out and fusion of the porous layer is completed. In this regard, reference is made to the initial evaporation rate illustrated in FIG. 7. For this reason, the exposure time is desirably regulated to maintain the solvent atmosphere until the coating reaches the desired degree of solution. In the tests of four identical coatings which are illustrated by the graph in FIG. 7, complete dissolution of each coating layer was obtained in less than 10 seconds and it can be noted that when complete dissolution is achieved total exposure time has only a limited effect on the total condensate retained after a drying of approximately 100 seconds (see FIG. 7).

As can be noted from FIG. 7, after drying for as little as 3 minutes in a recovery system, about ⅔ of the condensate can be recovered. This rapid recovery capability constitutes another very worthwhile economy of the present method.

In order to more clearly demonstrate the novel method of this invention, specific coating formations are described below.

In each of Examples 1–8 below, the particulate materials are adhered to the substrate by means of electrostatic attraction such as described above, in this instance using a SAMES Electrostatic Fluidizing Bed. Chloroform was utilized as a solvent and was vaporized in an ordinary commercial degreasing unit, viz, Model ZD–500–E, size B–62, by Deprex Chemical Industries, Inc. The various substrates were preconditioned to ordinary room temperature (i.e., approximately 70–75° F.) and the solvent vapor temperature was the boiling temperature of chloroform at ordinary atmospheric conditions (i.e., approximately 138° F.). The coating material used in the following examples have a particle size distribution such as is exemplified by the previously described screen analysis.

EXAMPLE 1

A 3" x 3" x ⅛" polished steel plate is coated with Tenite butyrate powder (a cellulose acetate butyrate with an acetyl content in the 13–15 weight percent range, butyral content of 34–47 weight percent, and 1–2 weight percent of free hydroxyl groups and having a 4:1 viscosity in acetone of about 18–25 seconds by ASTM D817–62T, Sec. 56 using Formula A and ASTM D1343–56 by ball drop method) modified by addition of di-butyl sebacate plasticizer in the 13–16 pH range and a stabilizer. The powder is adhered to the room temperature plate and subsequently caused to flow out and fuse by immersion of the powder coated plate in the chloroform vapor for 30 seconds. The coated plate is then placed in a convection oven at 120° F. for 30 minutes to hasten removal of the solvent from the coating. The coating film is stripped from the plate and determined to be a uniform four mils thick, bubble-free, exceptionally smooth and clear.

EXAMPLE 2

A hardwood hammer handle is coated with two 5 mil films of the Tenite® butyrate powder having a beige colorant added. The coating layers are sequentially applied and exposed to the solvent vapors for 20 seconds. The conditions are the same as described in Example 1 except that no drying time lapse occurs between the first vapor fusion and the second powder application. The final colored coating film formed is norminally 10 mils thick and is smooth and substantially void free.

EXAMPLE 3

Glass bottleware is similarly coated with unmodified cellulose acetate propionate ester with unmodified cellulose acetate ester powders with no plasticizers, stabilizers or pigments and is exposed to solvent vapors for 60 seconds. After drying, the coating films are smooth, clear and of nominal 5 mil thickness.

EXAMPLE 4

A phenolic molding is coated in the manner set forth in Example 1 with Tenite® butyrate like that of Example 1 but having black colorant added. The molding and porous coating layers are exposed to solvent vapors and dried as in Example 1. Previous attempts to coat similar parts by conventional heat fusion methods have resulted in damage to the part; but no adverse effect to the molding is observed when coated in the above-described manner. The coating film produced is smooth, bubble-free and of nominal 5 mil thickness.

EXAMPLE 5

A zinc die cast automobile horn ring is coated with Tenite® butyrate having gray colorant added and is exposed to solvent vapors for 20 seconds under conditions like that of Example 1. No distortion of the low melt alloy is encountered and the colored coating film is again found to be smooth, homogeneous and of nominal 10 mil thickness.

EXAMPLE 6

A cellulose acetate butyrate such as in Example 1 but without the addition of the plasticizer is adhered to a 12" x 14" x ⅛" stainless steel plate in the manner described. After exposure to solvent vapors for 20 seconds and drying, the coating film is stripped from the plate. The coating film is smooth, clear and approximately 2 mils thick.

EXAMPLE 7

An aluminum probe .70" in diameter by 10" long and having a hemispherical end is coated with cellulose acetate butyrate to form a porous layer like that described in Example 1. The coated probe is exposed to the chloroform vapors for 25 seconds, i.e., until flow out and fusion are complete, and then was allowed to dry in the manner described. The "test tube" thusly formed is removed from the probe and observed to be smooth, pore free and approximately 8 mils thick.

Other coating films which may be formed under conditions varying from those of Examples 1–7 and/or using different coating materials from those used in Examples 1–7 are describe below.

EXAMPLE 8

A two-part rotational casting mold, 6" in diameter by 13½" long with hemispherical ends, is opened and a porous layer of powdered cellulose acetate butyrate is electrostatically adhered thereto using an Ashdoe electrostatic spray gun. The two halves are assembled with the end plugs removed and exposed to chloroform for 30 seconds under the conditions described above. The vapors enter the mold, condense initially upon the mold surface and thereafter dissolve and fuse the porous layer. After such drying as was described in Example 1, the mold is opened. The coating film is removed and observed to be of variable thickness of from 5–10 mils and to be smooth, homogeneous and substantially void free.

EXAMPLE 9

Powdered cellulose acetate butyrate such as used in Example 1 is elecrtostatically adhered to a section 5 mils thick of Kodar® film (product of Tennessee Eastman Company), of poly(1,4-cyclohexylenedimethylene terephthalate-isophthalate), so as to form a porous layer thereon. The film section and porous layer are exposed to chloroform vapors at 138° F. for 30 seconds; however, the combination has inadequate mass to condense sufficient solvent to fuse the layer. The same film is then wrapped around a 3″ O.D. iron core and placed in the 138° F. solvent vapors for 10 seconds. With the aid of the heat-sink, more than enough solvent is condensed upon the substrate to dissolve and fuse a smooth two mil coating film on the film section. The substrate temperatures, both of film section and iron core are initially at 75° F. This example demonstrates one method of maintaining substrate temperatures so as to obtain proper amounts of solvent condensate upon the substrate.

EXAMPLE 10

A porous layer of powdered cellulose acetate butyrate such as that in Example 1 is electrostatically adhered to a glass bottle such as was described in Example 3 with the exception that the bottle is previously heated to 150° F. The heated bottle and adhered layer are then immersed in chloroform vapors at 138° F. The solvent vapors cannot condense upon the heated substrate surface and no fusion of the porous layer occurs. The bottle is removed from the solvent vapors, cooled to 100° F. and replaced in the vapors. The solvent is observed to condense on the bottle and the porous layer was fused into a smooth, continuous substantially void-free coating. This example demonstrates how substrate temperatures can be preconditioned to regulate solvent condensation upon the substrate.

EXAMPLE 11

In order to demonstrate the applicability of the present method to other solvent-polymer combinations, a 3″ x 6″ x .037″ clean steel plate is electrostatically coated in the manner described in Example 1 with a porous layer of particle materials having the same size distribution as those in Example 1. In each instance, the plate and powdered polymers are at room temperature and are exposed for 20 seconds to solvent vapors at the vaporization temperature and under atmospheric conditions. The following solvent-polymer combinations are found to produce homogeneous, substantially void-free coating films of nominal 5 mil thickness.

(1) Methyl methacrylate (Rohm & Haas K–120–N) fused by the above-stated procedures with both methyl ethyl ketone and chloroform.
(2) The following polyvinyl chloride acetate copolymers are fused by the above-stated procedures with both methyl ethyl ketone and chloroform:
 (a) VYHH (Union Carbide)
 (b) Exon 477 (Firestone)
 (c) Exon 470 (Firestone). This copolymer is maleated.
(3) Polyvinyl butyral (Union Carbide VMCH) is fused by the above-stated procedures with both methyl ethyl ketone and chloroform.
(4) Polyvinylidene chloride (Dow Chemical—Saran F–220) is fused according to the above-stated procedures with tetrahydrofuran.

EXAMPLE 12

A test is conducted to demonstrate the use of the present method to form polymeric coatings which strongly adhere to metallic surfaces. Initially, a nominal 1 mil porous layer of polyvinyl chloride acetate copolymer (maleated) having a particle size in the range set out as to Examples 1–8, is adhered electrostatically to a 3″ x 6″ x .037″ clean steel plate. The panel at 75° F. is exposed to chloroform vapors at the vaporization temperature for 5 seconds. The 1 mil porous layer is fused into a uniform film which adhered to the plate. The thusly primed panel is then provided with a 5 mil electrostatically adhered porous layer of cellulose acetate butyrate particles having size distributions as previously described and subjected to the chloroform vapors for 20 seconds. After drying for 2 days to composite coating has excellent adhesion to the panel and was homogeneous and substantially void free.

EXAMPLE 13

Since many solvents, such as chlorinated solvents, have vapor densities much greater than air, it is possible to effect fusion by pouring the solvent vapors upon the porous layer. To demonstrate this mode of the present method, a 3″ x 6″ x .037″ clean steel panel, at 75° F. is electrostatically coated with 5 mils of cellulose acetate butyrate. The plate is held in a horizontal position, coated side up, and exposed to chloroform vapors poured from a vapor source. This method is satisfactory of the pouring continues until the coating has properly fused. The minimum exposure is 15 seconds. It is desirable during the 15 second exposure for the coating to be completely covered with the poured vapors so condensate would not evaporate.

EXAMPLE 14

To demonstrate the applicability of the present method to coating materials in the staple form, cellulose acetate staple (8 denier x ¼″) is electrostatically adhered on a 3″ x 6″ x .037″ clean steel plate having a temperature of 75° F. The plate and polymer layer are exposed to acetone vapors at the vaporization temperature for 20 seconds. The staple layer is converted into a dense matt with the individual filaments fused together. In the matt formed, the individual filaments could still be identified.

In order to demonstrate the applicability of the present method to other coating materials the following tests are performed.

EXAMPLE 15

A 3″ x 3″ x ⅛″ metal plate at room temperature is electrostatically coated with powdered gelatin in the manner described in Example 1. Steam at 212° F. is directed onto the plate and porous coating layer for 30 seconds and allowed to condense upon the substrate. The gelatin fuses into a smooth, continuous film of approximately 5 mils thickness.

EXAMPLE 16

A coating film is formed in a manner like that in those of Example 15 but using instead a powdered polyvinyl alcohol layer of approximately the same mesh distribution as the particles of Examples 1–8 to form the coating. Upon exposure to the steam vapors for 30 seconds a smooth continuous film is formed which is approximately 5 mils thick.

In both Examples 15 and 16 the drying time was longer than in Examples 1–8 due to the low volatility of water.

EXAMPLE 17

Another example is prepared wherein powdered sugar is coated onto a 3″ x 6″ x .037″ aluminum panel. Finely powdered sugar is electrostatically deposited on the panel and then exposed to steam for 30 seconds. The steam condensate forms on the panel in small droplets and dissolves the sugar. The dried coating is not uniform but has a shape dictated by the condensate droplets. It is believed that the incorporation of a wetting agent in the sugar would cause the condensate/sugar solution to flow into a uniform film.

In view of the foregoing description it will be readily apparent to one skilled in the art that we have described a novel and improved method for producing smooth, substantially voidless, coating films on widely differing substrate surfaces. It is further apparent that the method may be utilized to produce a variety of film coatings including moldings and castings.

The invention has been described in detail with particular reference to preferred embodiments thereof, but it will be understood that variations and modifications can be effected within the spirit and scope of the invention.

We claim:

1. A solvent vapor condensation method for coating a nonabsorbent massive article of metal, wood, glass or plastic having some surface areas which are substantially vertical with a continuous, homogeneous, void-free polymeric film having a thickness of a least one mil, said process comprising the steps of:
   (a) depositing and electrostatically adhering a layer of polymeric material in particulate form on substantially the entire outer surface of said article to form a coated article having a porous layer thereon, the coated article being at a solvent vapor condensation temperature below the boiling point of a selected composition which is a solvent for the polymeric material at its boiling temperature and within a temperature range therebelow including said solvent vapor condensation temperature, said temperature range being below the temperature at which said article is adversely affected, and
   (b) exposing said coated article at a temperature below the melting point of said polymeric material to an atmosphere consisting essentially of solvent vapors of said selected composition whereby said solvent vapors condense on the surface of the coated article to fuse said polymeric material and form a substantially continuous film on said article, the fusion of those portions of the particulate material adjacent the surface of the article occurring before the fusion of the other portions of said layer of particulate material and the layer is fused progressively outwardly from the surface of the article,
whereby said continuous film is formed as a smooth layer at least 1 mil thick substantially without the occurrence of running on said areas which are substantially vertical during the solvent vapor condensation and fusion of said polymeric material.

2. A method according to claim 1 wherein the article and layer of polymeric material in particulate form are maintained in the vapors of said solvent until fusion of the layer is complete and the defined process steps (a) and (b) are repeated at least one more time, the thickness of the film being at least 5 mils for each said time.

3. A method according to claim 1 wherein the polymeric material comprises cellulose acetate butyrate.

4. A methods according to claim 1 wherein the polymeric material comprises cellulose acetate propionate.

5. A method according to claim 2 wherein the polymeric material comprises cellulose acetate butyrate.

6. A method according to claim 2 wherein the polymeric material comprises cellulose acetate propionate.

7. A method according to claim 1 wherein said article is essentially composed of wood and the solvent vapor condensation temperature is below that temperature at which the shape of the wood is adversely affected.

References Cited
UNITED STATES PATENTS

| | | | |
|---|---|---|---|
| 2,726,166 | 12/1955 | Greaves | 117—21 |
| 2,776,907 | 1/1957 | Carlson | 117—21X |
| 2,922,230 | 1/1960 | Carlson | 117—21 |
| 2,995,464 | 8/1961 | Gundlach | 117—21X |
| 3,002,849 | 10/1961 | Harmon et al. | 117—21 |
| 3,049,810 | 8/1962 | Iwerks | 117—21X |
| 3,117,847 | 1/1964 | Norton | 117—21X |
| 3,132,047 | 5/1964 | Van Dorn | 117—21 |
| 3,288,624 | 11/1966 | Clark | 117—21 |

OTHER REFERENCES

Dessauer and Clark, "Xerography and Related Processes," July 19, 1965, pp. 401–403.

WILLIAM D. MARTIN, Primary Examiner

R. M. SPEER, Assistant Examiner

U.S. Cl. X.R.

117—63